Dec. 22, 1970  TAKEO SAWATARI  3,549,240
OPTICAL FILTERING METHOD AND APPARATUS
Filed Nov. 6, 1967  6 Sheets-Sheet 3
FIG_5
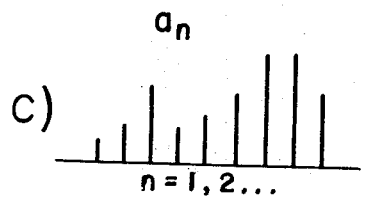
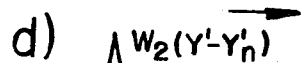
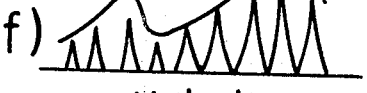
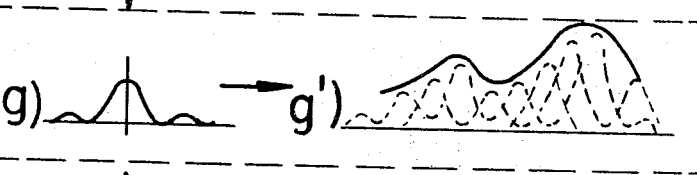
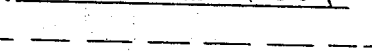
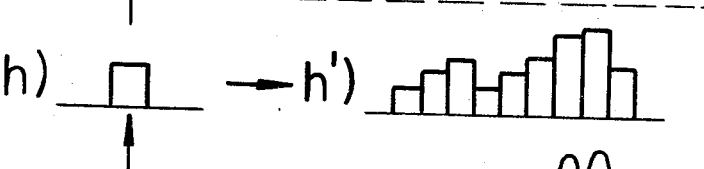
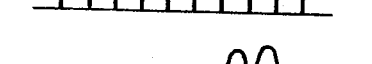
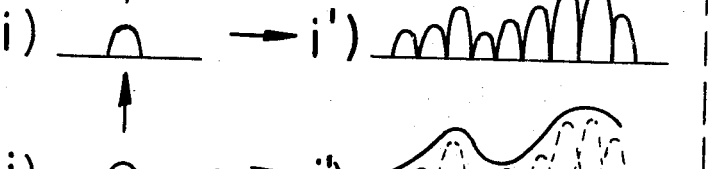
FIG_6b
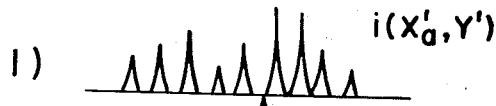
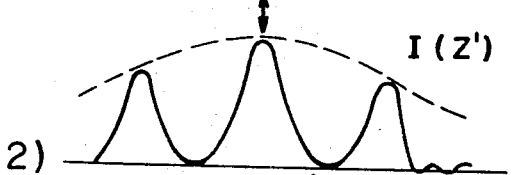
FIG_6a
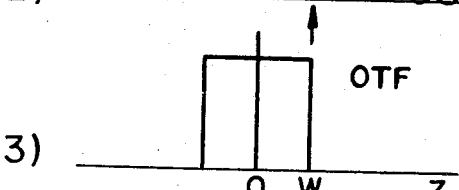
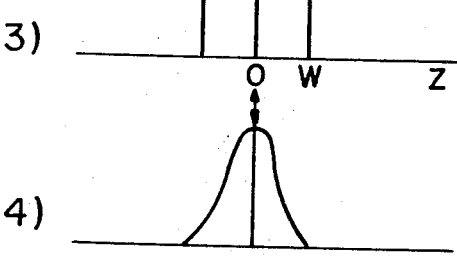
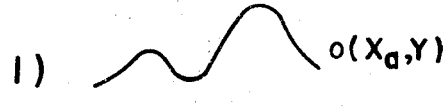
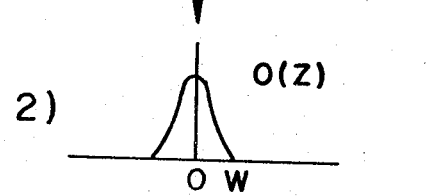
INVENTOR.
TAKEO SAWATARI
BY Townsend and Townsend
ATTORNEYS

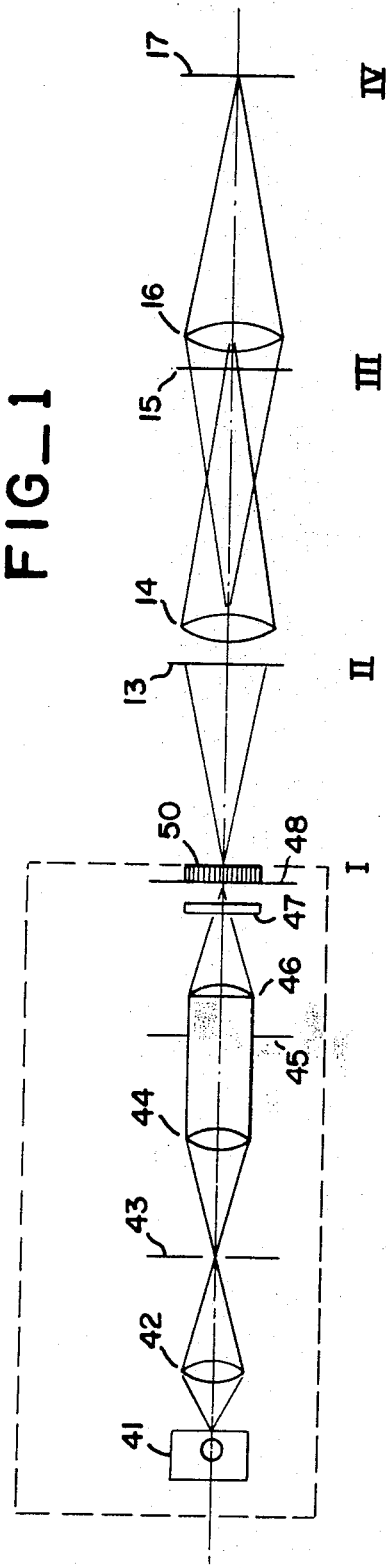
FIG_1
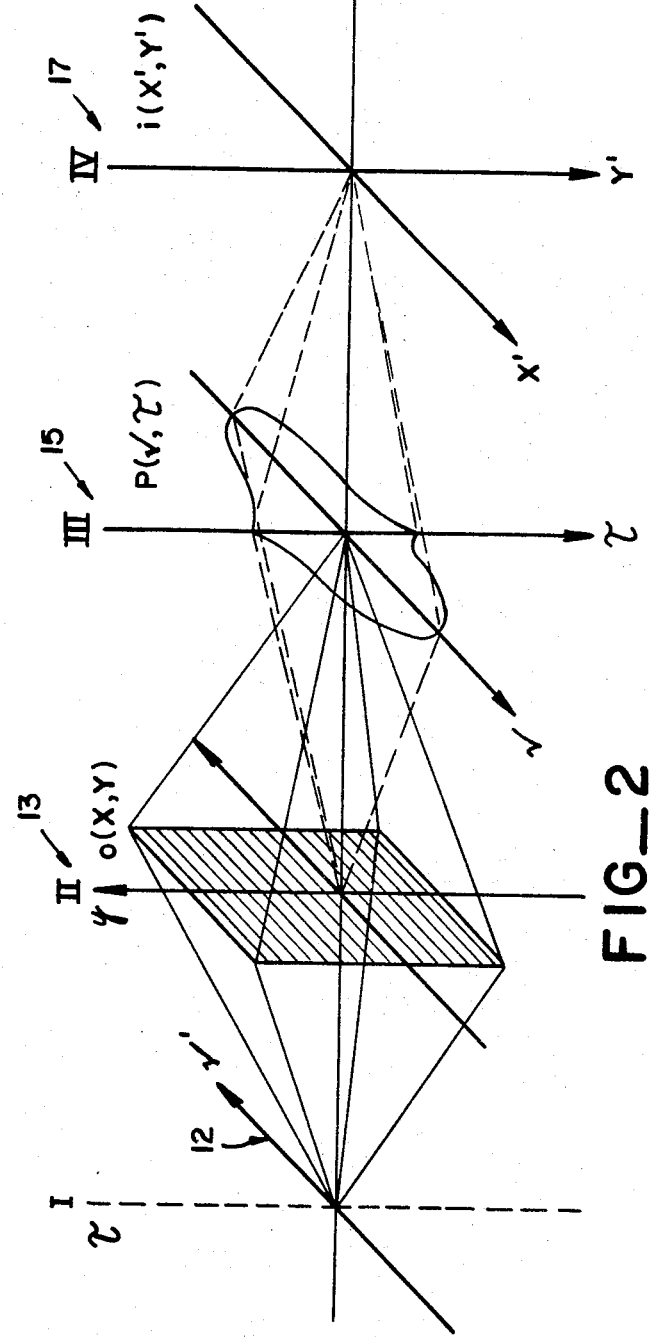
FIG_2
INVENTOR.
TAKEO SAWATARI
BY
*Townsend and Townsend*
ATTORNEYS

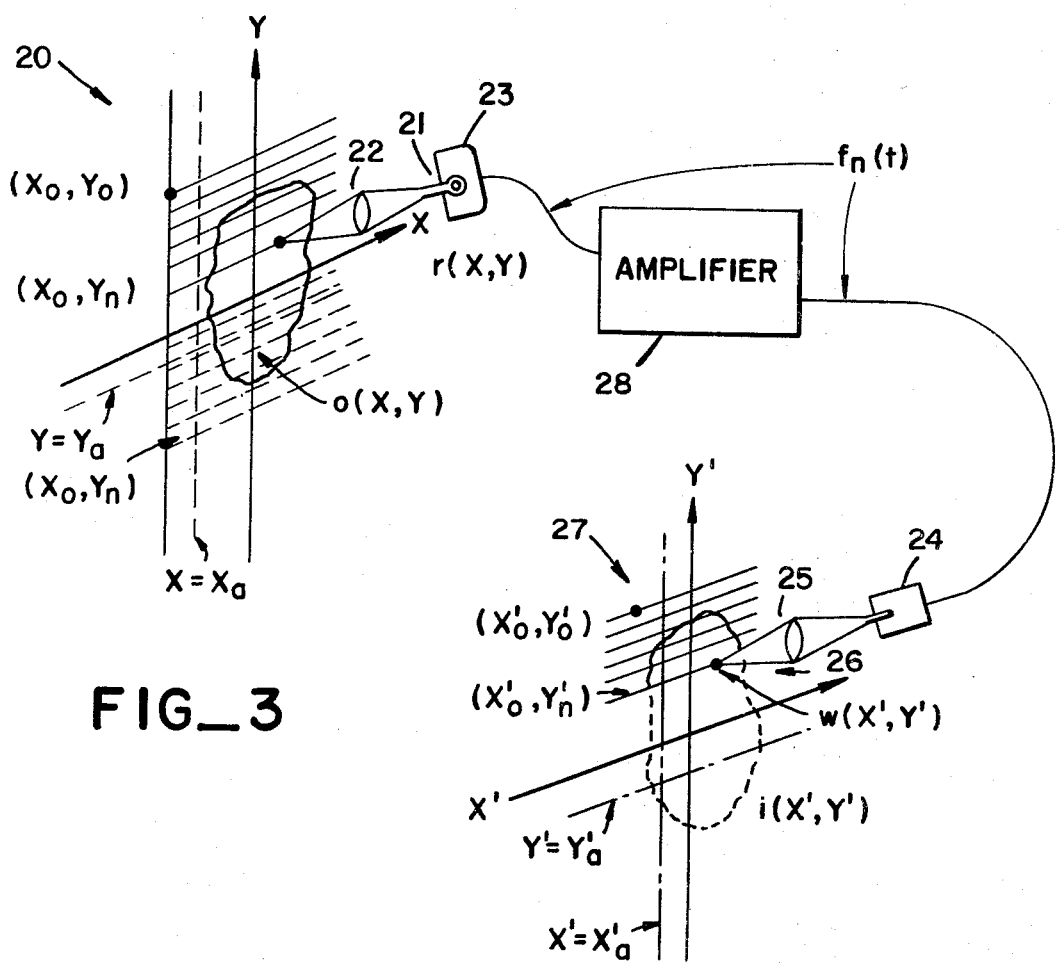
FIG_3
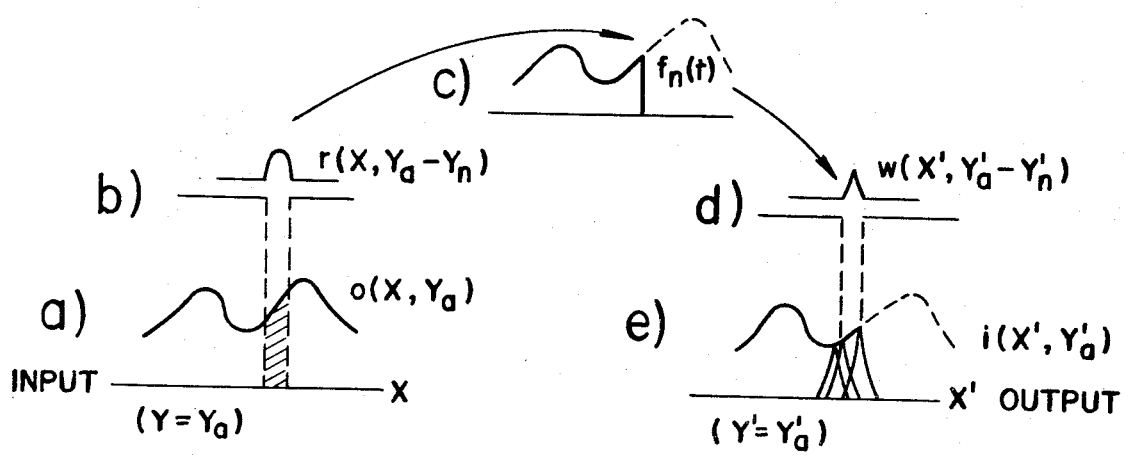
FIG_4

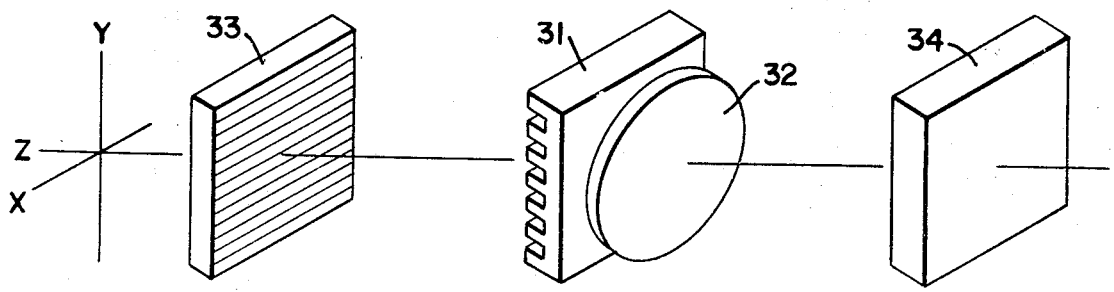
FIG_7
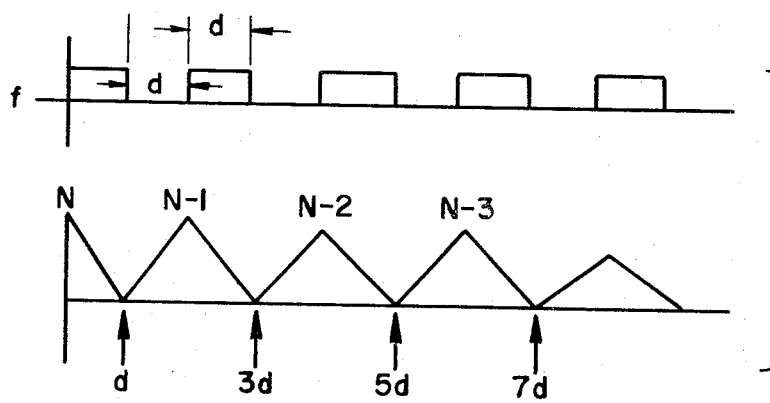
FIG_8
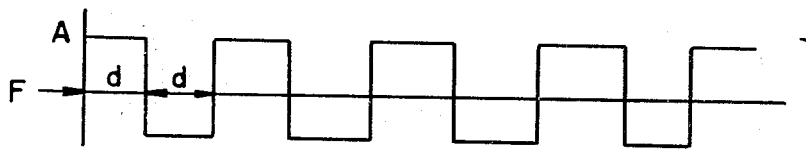
FIG_9
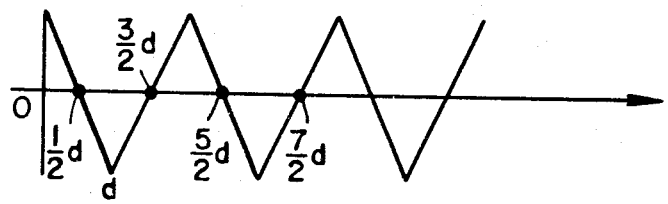
FIG_10
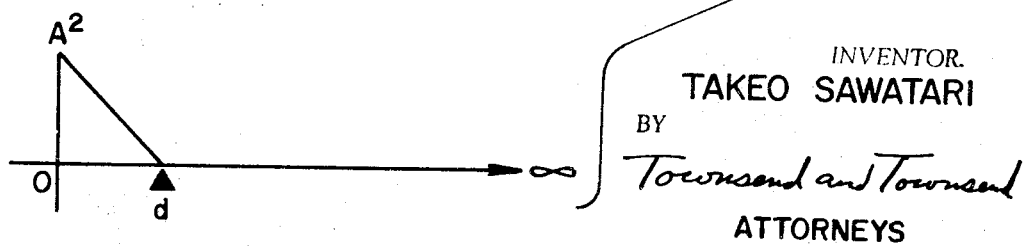

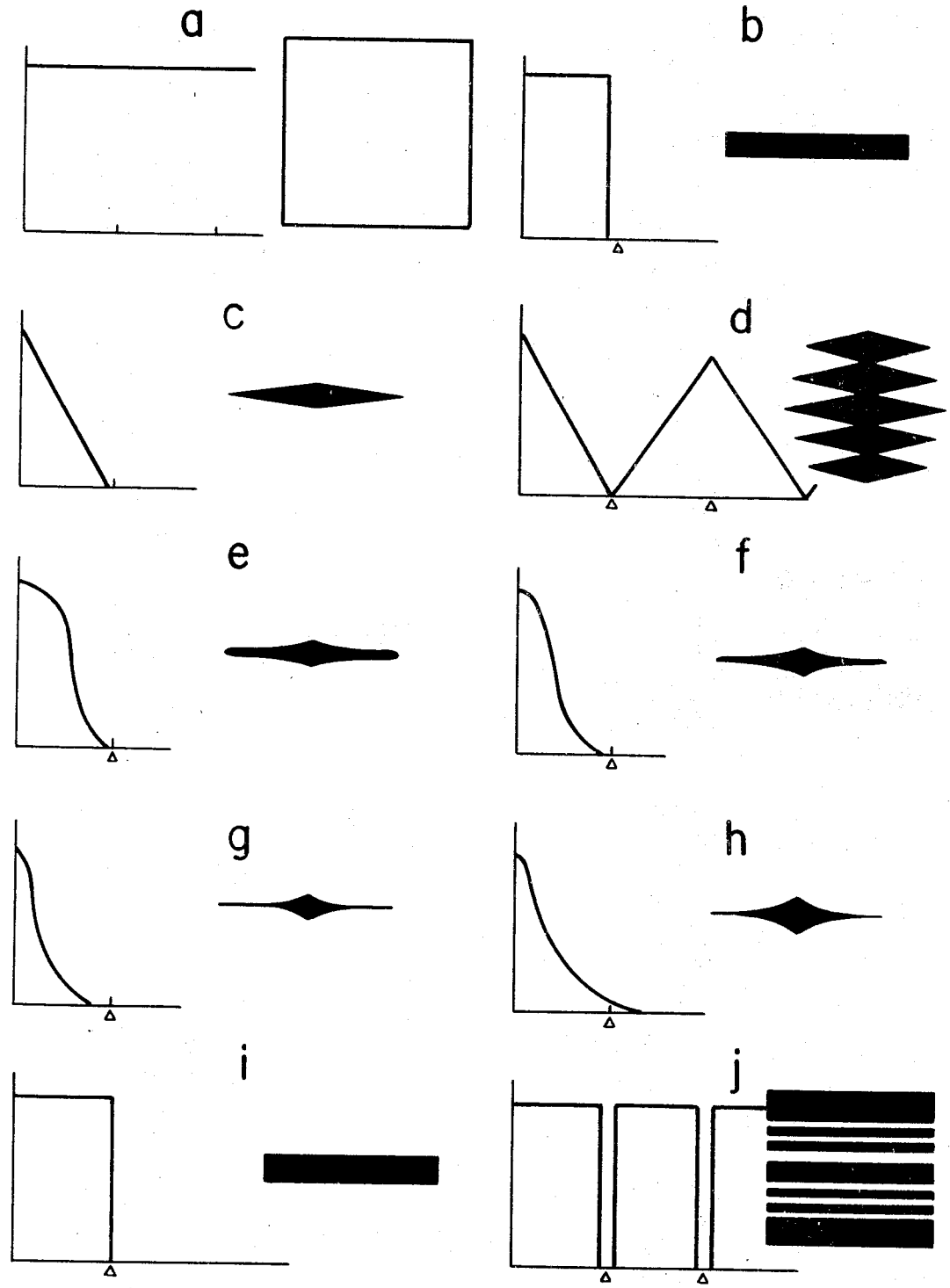
FIG_11

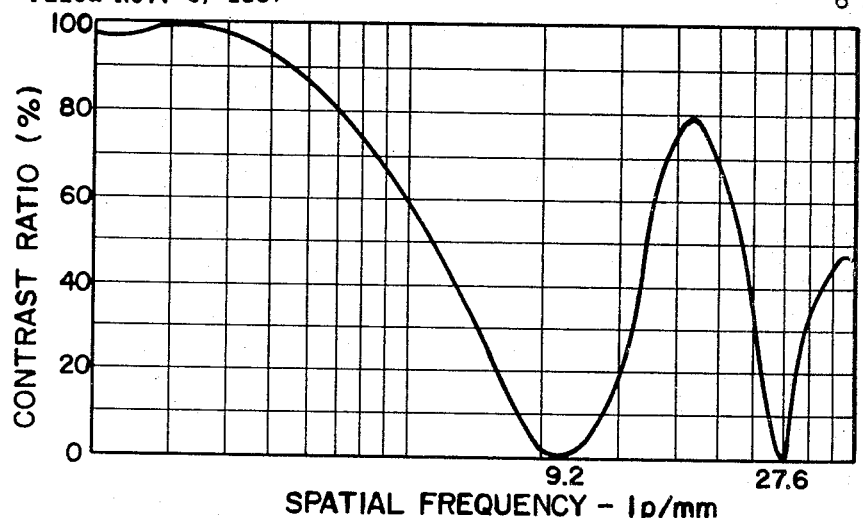
FIG_12a
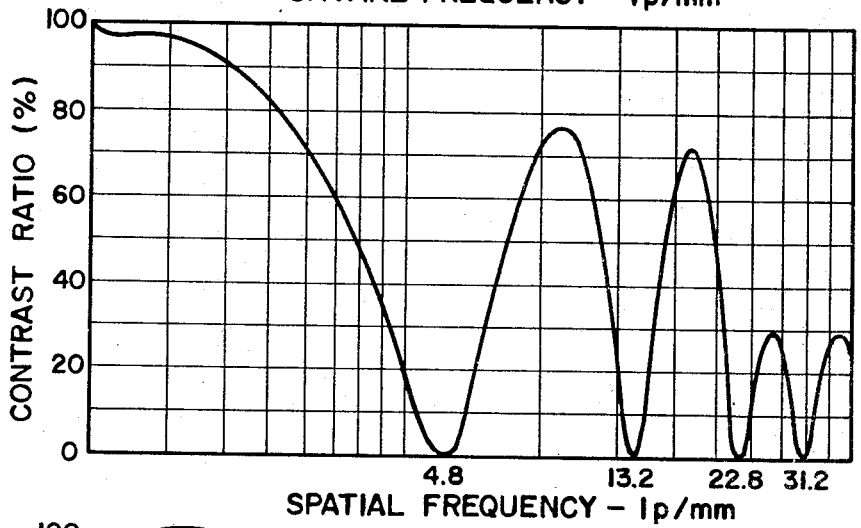
FIG_12b
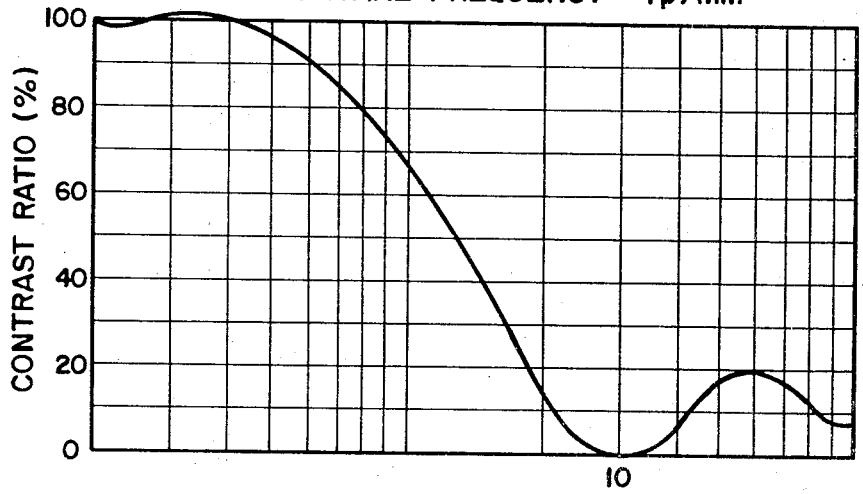
FIG_12c

United States Patent Office 3,549,240
Patented Dec. 22, 1970

3,549,240
OPTICAL FILTERING METHOD AND APPARATUS
Takeo Sawatari, Palo Alto, Calif., assignor to Optics Technology, Inc., Palo Alto, Calif., a corporation of California
Filed Nov. 6, 1967, Ser. No. 680,649
Int. Cl. G02b 27/38
U.S. Cl. 350—162                                                    7 Claims

ABSTRACT OF THE DISCLOSURE

An optical filtering method and apparatus is disclosed wherein a transparency is made of the image to be modified and placed in the pupil of a lens. A line light source is provided to illuminate the transparency coherently in the direction of the noise pattern to be eliminated and incoherently in the orthogonal direction in the plane of the transparency to produce a one dimensional diffraction pattern in a plane spaced from the lens. A plurality of binary masks are sequentially placed in the plane of the diffraction pattern, said masks having opaque portions and transparent cut-out portions in the configuration or shape of a range of modulation transfer functions to be tested and a modified image of the transparency formed by a second lens for psychophysical evaluation. A spatial filter is fabricated having the desired MTF and incorporated in the image forming aperture of the image forming and recording system from which the transparency was made.

BACKGROUND OF THE INVENTION

Field of the invention

This invention relates to a new and improved method and apparatus for optical filtering to eliminate optical noise from formed images. Optical noise comprises any optical information desired to be eliminated. More particularly, the invention relates to a new and improved method and apparatus for optimum optical filtering to eliminate random and periodic noise line patterns in optical scanning systems such as provided by TV scans, electro-optic scanning systems, opto-mechanical scanning systems, scanning reconnaissance systems, and other real time or simulated scanning systems.

Description of the prior art

Image forming and recording systems generally superimpose a pattern of optical noise on the original information obtained from the object whose image is to be formed. The resulting image includes the optical noise pattern which partially obscures the information from the original object. The nature of the optical noise pattern depends upon the operating parameters of the image forming and recording system. For instance, photoengraving apparatus may produce moire patterns or dot patterns on photo-engraved images. Fiber optic bundles produce a pattern of spots and fiber optic plates produce a pattern of lines on formed images passed through the respective systems. In particular, electro-optical, opto-mechanical and other real time scanning systems for producing scanned line images superimpose an array of one dimensional noise lines on the formed images which partially obscures the original information.

Attempts in the past to filter out optical noise produced in image forming and recording systems have included the introduction of spatial filters, either amplitude filters or phase filters, in the image forming aperture or objective lens aperture of the system through which the object information must pass to alter the spread function of the system which determines the content of the formed image and thereby improve the quality of the image. Such filters operate by passing only certain portions of the spatial frequency spectrum while eliminating others. Portions of the spatial frequency spectrum attributable to the optical noise are intended to be eliminated. The spatial filter is thus analogous to a bandpass filter in frequency space and subject to the limitations that its passing and blocking characteristics are non-ideal.

The function which characterizes the ability of the image forming and recording system to pass or block portions of the spatial frequency spectrum is the modulation transfer function (MTF) of the system. Not only are the cut-off characteristics of the MTF important insofar as eliminating optical noise, but also the shape of the MTF insofar as preserving the information obtained from the object whose image is to be formed.

The MTF of an image forming system depends among other things upon the aperture function of the spatial filter used in the system. Alteration of the aperture function of the filter modifies the spread function of the image forming and recording system and consequently the MTF of the system thereby modifying the spectrum of spatial frequencies comprising the formed image. The optimum spatial filter aperture function and corresponding MTF necessary for highest quality image production in any particular image forming and recording system generally cannot be determined analytically by any direct method.

Thus, the psychophysical evaluation of a range of spatial filter aperture functions is required to supplement analysis which can only generally supply characteristics of the optimum spatial filter aperture function and corresponding MTF for a given image forming and recording system. Psychophysical evaluation of a range of aperture functions, however, is impeded by the difficulty and expense in fabricating spatial filters. In the past, means have been developed for evaluating a range of aperture functions by providing an equivalent system using either all incoherent illumination or all coherent. Such methods, however, require the fabrication of either phase filters or amplitude filters. Phase filters are extremely difficult to fabricate. The range of aperture functions and corresponding MTF's may be evaluated using continuous tone masks rather than fabricating phase filters. Such continuous tone masks are themselves difficult to form however. In addition, amplitude filters of the binary mask variety, while easier to make are far less effective than phase or continuous tone masks if all coherent or all incoherent illumination is used. In fact, before the present invention, no simple, direct and inexpensive method for determining the characteristics of the optimum spatial filter existed. Difficulties in the fabricating of effective spatial filters have thus resulted in limited application and use of this type of image modification.

SUMMARY OF THE INVENTION

It is an object of the present invention to provide optimum spatial filters to eliminate noise patterns in formed images and provide continuous tone images with high image contrast while retaining substantially all information obtained from the object whose image is being formed. By the use of such filters, portions of the spatial frequency spectrum attributable to optical noise are substantially eliminated and portions of the spatial frequency spectrum attributable to object information are substantially preserved.

Another object of the invention is to provide a simple, direct and inexpensive method for determining the optimum spatial filter for a given image forming and recording system without the necessity of fabricating a range of phase filters or a range of continuous tone film masks. Such method is particularly applicable to electro-optic, opto-mechanical and other real time scanning systems which introduce one dimensional noise in unidirectional arrays into the formed image. More generally, the method is applicable for determining the optimum spatial filter for image forming and recording systems in order to eliminate any one dimensional noise either unidirectional or multidirectional by determining the respective axes of the noise pattern directions and eliminating them sequentially.

According to the present invention, a transparency is made of the image to be modified. The word "transparency" as used herein is not limited to photographic film transparencies but may include any means for modulating light with image information such as gratings, masks, etc. The plane of the transparency is the plane on which illuminating light is incident. A line light source is provided to illuminate the transparency with monochromatic light, coherent in one direction, the direction of the noise pattern to be eliminated, and incoherent in the orthogonal direction lying in the plane of the transparency. Although monochromatic light need not be used, the efficiency of the method increases with increasing monochromaticity. A line light source is defined as a light source providing diffused incoherent light in the direction of the line source of light and substantially coherent light in a direction orthogonal to the line source of light.

The direction of the noise pattern is, in the case of one dimensional noise lines, the direction lying in the plane of the noise lines and perpendicular to them. Thus, for unidirectional scan lines as produced by scanning systems, the direction of the noise pattern to be eliminated is the direction perpendicular to the scan lines in the plane of the transparency. For multidirectional noise, one direction at a time may be eliminated.

Positioned adjacent the transparency is a lens to form the one dimensional diffraction pattern produced by the coherent light passing through the optical noise pattern of the transparency. The diffraction pattern provides a physical display of the spatial frequency spectrum of the object distribution so that undesirable portions of the spectrum may be easily eliminated. A plurality of binary masks is placed sequentially in a plane spaced from the lens. The binary masks are opaque having transparent cut-out portions in a range of shapes in the configuration of a range of MTF's to be evaluated to thereby eliminate the portions of the spatial frequency spectrum which would be blocked by the respective MTF's. The range of masks may be selected not only to eliminate certain spatial frequencies completely, but also may be cut to allow only portions of specific spatial frequencies to appear in the image. A second lens adjacent the binary mask then forms a modified image which may be photographed for psychophysical examination and evaluation. The optimum image and corresponding binary mask and associated transfer function may then be determined.

Thus, according to this method, any particular image may be filtered to obtain the optimum modified image with optical noise elimination. Furthermore, information may be obtained for constructing the optimum spatial filter for any real time image forming system.

Instead of the system of lenses described above, an equivalent system of mirrors could be used as is well known in the art. The optical train would then assume a circular, zig-zag, or other appropriate configuration rather than the coaxial configuration described for the lens system above.

In order to eliminate multidirectional noise, the transparency may be rotated and the process repeated to determine the optimum spatial filter for eliminating each direction of noise sequentially. The method also has application in determining the optimum spatial filter for eliminating the optical noise or blurr introduced by high speed motion of the object whose image is being formed.

BRIEF DESCRIPTION OF THE DRAWINGS

FIG. 1 is a diagrammatic view from the side of one form of optical train embodying the present invention.

FIG. 2 is a schematic fragmentary view of a portion of the optical train illustrated in FIG. 1.

FIG. 3 is a schematic illustration of a generalized electro-optic scanning apparatus and method.

FIG. 4 shows a sequence of graphs of the operative parameter functions of the electro-optic scanning system shown in FIG. 3 along the X axis.

FIG. 5 shows a sequence of graphs of the operative parameter functions of the electro-optic scanning system shown in FIG. 3 along the Y axis.

FIGS. 6a and 6b are graphs of image and object intensity functions shown in FIG. 5 with corresponding spatial spectral distributions.

FIG. 7 is a diagrammatic perspective view of a scanned line image forming system including an optimum spatial phase filter embodying the present invention.

FIG. 8 is a graph of the aperture function of a spatial amplitude filter and its auto-correlation function.

FIG. 9 is a graph of the aperture function of a periodic phase filter and its auto-correlation function.

FIG. 10 is a graph of the aperture function of a random phase filter and its auto-correlation function.

FIG. 11 is a sequence of graphs showing a range of MTF's adjacent corresponding cut-outs from binary masks.

FIGS. 12a, 12b, and 12c are graphs showing the MTF of a periodic phase filter, random phase filter and amplitude filter, respectively, in conjunction with an objective lens, determined experimentally with an MTF analyzer.

DESCRIPTION OF THE PREFERRED EMBODIMENTS

In the embodiment of the present invention illustrated in FIGS. 1 and 2, there is provided a method and apparatus for determining the optimum MTF for an image forming and recording system comprising generally a line light source 12 for providing at Plane I of an optical train, monochromatic light coherent in one direction and incoherent in the orthogonal direction. Illuminated by the light is a transparency 13 of an image formed by an image forming and recording system, positioned at Plane II of the optical train adjacent a lens 14 which forms a one dimensional diffraction pattern from coherent light passed through the transparency, at Plane III of the optical train. Positioned in Plane III is a binary mask 15 comprising an opaque sheet having a transparent cut-out portion in the configuration of an MTF to be tested. A lens 16 focuses light passing through binary mask 15 to form a modified image at screen 17 for psychophysical evaluation. The line light source 12 and transparency 13 are oriented to provide coherent light in the direction of an optical noise pattern to be eliminated. After psychophysically evaluating a range of binary masks and corresponding MTF's, a spatial filter may be fabricated to yield the successful MTF in conjunction with the image forming and recording system with which it is to be used. Or, if the system is being used to correct only a particular image, the modified image may be formed with the selected binary mask and associated MTF to eliminate the optical noise pattern and provide an image with continuous tone and high image contrast for photographing or other purposes.

In order to understand the operative parameters and background of the present invention, reference is made to the image forming and recording system illustrated schematically in FIG. 3. The system there illustrated is a generalized electro-optic scanned image forming system which superimposes an array of parallel one dimensional noise lines on the formed image. The continuous tone object whose image is formed is taken to be self-emitting of diffusely reflected or transmitted light.

The system consists of an object intensity function $o(X, Y)$ in the object plane 20 defined by X and Y axes which is scanned periodically in the Y direction and continuously in the X direction in lines parallel to the $x$ axis by a reading aperture 21, defined by the function $r(X, Y)$, through lens 22. A detector 23 such as a photomultiplier tube is placed behind the reading aperture 21 and the time signal $f_n(t)$ generated by the detector 21 due to scanning along a particular line $Y=Y_n$, is fed through an amplifier 28 to a glow tube 24. The output of the glow tube 24 passes through a lens 25 and writing aperture 26 defined by the function $w(X', Y')$ and is then recorded along line $Y'=Y_n'$ as an intensity distribution defined by the image intensity function $i(X', Y')$ in the image plane 27 defined by X' and Y' axes. Image recordation takes place periodically in the Y' direction and continuously in the X' direction in lines parallel to the $x'$ axis. Thus, image point $(X_o', Y_n')$ corresponds to object point $(X_o, Y_n)$, etc. The response of the amplifier and glow tube are assumed to be linear.

The time signal $f_n(t)$ produced by the $n$th scanning line beginning at $(X_o, Y_o)$ is given by convolution of the object function $o(X, Y_n)$ and the reading aperture function $r(X, Y_n)$. The image intensity function $i(X', Y_n')$ along the line $Y'=Y_n'$ is produced by a convolution of the time function $f_n(t)$ and the writing aperture function $w(X', Y_n')$. The final image $i(X', Y')$ rather than being continuous toned, is composed of scanned lines.

In order to investigate the physical concepts of this scanning process for purposes of filtering out the array of one dimensional optical noise lines introduced by the scanning process, a simplifying condition is imposed that the spatial spectral bandwidth of the object whose image is to be formed is less than one-half the spatial carrier frequency of the line scanned image so that the object information may be separated from the introduced optical noise by simple filtering. The following explanation is furthermore not mathematically rigorous.

The imaging process in the X' direction along the line $Y'=Y_a'$ is illustrated graphically in FIG. 4. The input object intensity $o(X, Y_a)$ along the line $Y=Y_a$ shown at FIG. 4a is scanned continuously by a cross-section of the reading aperture $r(X, y_a-y_n)$ shown in FIG. 4b. The convolution of the two functions produces a time signal $f_n(t)$ shown in FIG. 4c which when convoluted with the respective writing aperture cross-section $w(X', Y_a-Y_n')$ shown in FIG. 4d produces the continuous image intensity line $i(X', Y_a')$ along line $Y'=Y_a'$ as shown in FIG. 4e. The final image intensity along the line is thus determined by the spread function of the system, a convolution of the reading and writing apertures. In the X' direction along a line $Y'=Y_a'$ the spread function fairly reproduces the object intensity line $Y=Y_a$ preserving the spatial spectral distribution without introducing optical noise as shown in the integrated intensity envelope of FIG. 4e.

Imaging along a vertical line $X'=X_a'$ in the Y' direction is periodic however. The object intensity function $o(X_a, Y)$ along the line $X=X_a$ shown in FIG. 5a is scanned periodically by a reading aperture cross-section given by the sum of apertures periodically sampling the object, $$\sum_0^N r(X_a, Y-Y_n)$$

as shown in FIG. 5b where N is the total number of scan lines. The convolution of the two functions produces a spiked time signal $a_n$ which when convoluted with the output writing aperture cross-section $W_2(Y'-Y_n')$ yields the periodically scanned image line $i(X_a', Y')$ along the line $X'=X_a'$ as shown in FIGS. 5e and 5f. The final image line thus has a periodic noise pattern superimposed on it by the scanning method.

Since the final image is determined by the spread function of the system which is a convolution of the reading and writing apertures, improvement of image quality can be obtained by modifying the writing aperture and resultant spread function. FIGS. 5g–5j graphically illustrate a variety of different spread functions obtained by a variety of different writing apertures with the attendant image intensity contour illustrated in the graphs of FIGS. 5g'–5j. Such modification of the spread function can be obtained by spatial filtering, the problem being to determine the appropriate spread function which gives a psychologically pleasing continuous tone image containing maximum object information and minimum optical noise.

Spatial frequency spectrum analysis of the object and image intensity functions provides a starting point in formulating what the spatial filter must accomplish. FIGS. 6a–1 and 6a–2 show, respectively, the object intensity function heretofore described along the line $X=X_a$ and the spatial frequency spectrum $O(Z)$, having a half bandwidth W, obtained from the Fourier transform of the intensity function. This spatial frequency spectrum must be reproduced in the image for high quality reproduction.

FIGS. 6b–1 and 6b–2 illustrate, respectively, the image intensity function $i(X_a', Y')$ heretofore described, along the line $X'=X_a'$ and the corresponding spatial frequency spectrum $I(Z')$ obtained from the Fourier transform of the image intensity function. The spatial frequency spectrum $I(Z')$ includes portions not included in the original object spectrum and attributable to the optical noise introduced by the scanning system. The spatial filter must alter the writing aperture and therefore the spread function of the system to exclude portions of the spatial frequency spectrum attributable to the optical noise, in particular the spatial carrier frequency of the scanned image forming system, and pass the original frequency spectrum attributable to the object intensity only.

An ideal writing aperture function for the system described above is shown in FIG. 6b–3 with the portion of the image spectrum passed by the ideal writing aperture function shown in FIG. 6b–4.

Changing the writing aperture function alters the spread function of the system and thus the MTF of the system to permit only that portion of the spatial frequency spectrum corresponding to the original object intensity function to pass. The spectrum of spatial frequencies passed by the spread function, and given by the Fourier transform of the spread function is the MTF. The ideal MTF corresponds to the Fourier transform of the spread function shown graphically in FIG. 5g. However, it is impossible to make such a spread function because the intensity distribution is always positive, whereas the spread function in FIG. 5g includes negative portions.

Furthermore, the spatial spectral bandwidth of the object intensity function is normally not limited to less than half the spatial carrier frequency of the scanned line image so that portions of the spectrum attributable to object information and optical noise overlap thereby precluding simple ideal filtering. Other limitations include non-ideal cut-off characteristics in the spatial filters. The optimum spatial filter cannot therefore be determined analytically by any direct method.

The spatial filter which alters the writing aperture function to provide the best spread function and corresponding MTF for any given image forming and recording system and yet which can practically be made must therefore be determined by psychophysical evaluation. The optimum spatial filter may then be inserted into the aperture of lens 25 as shown in FIG. 3, to change the spread function of the system into the optimum form.

Thus, as shown in FIG. 7, spatial phase filter 31 is inserted in the aperture of the image forming lens 32. Scan format 33 corresponds to the scan format of a scanned image forming system. Due to the action of the filter in modifying the spread function of the system, the formed image at 34 has a smoothed format and continuous tone, with the optical noise introduced by the spatial carrier frequency of the scanning system eliminated.

The transfer function of the spatial filter can be calculated from the autocorrelation of the aperture function. FIGS. 8, 9 and 10 show graphically the aperture functions of an amplitude filter, periodic phase filter and random phase filter respectively, below which are shown the respective auto-correlations giving the respective transfer functions. The spatial frequency cut-off values $V_c$ for the spatial filters are given generally by the equation $$V_c = \frac{nd}{\lambda R}$$

where $\lambda$ is the wavelength of the transmitted light and R is the focal length of lens 32. For the amplitude filter $n$ is an odd integer. For the periodic phase filter, $n$ is equal to $$\left(m + \frac{1}{2}\right)$$

where $m$ is 0 or an integer. For the random phase filter $n=1$. The phase filters consist of transparent plates with planar surfaces provided with one dimensional parallel phase shift elements of width $d$ placed periodically or randomly. The periodic amplitude filter includes opaque or transparent parallel strips of width $d$ placed periodically. Thus each of the filters is designed for the elimination of optical noise in one dimension such as that created by scanning systems.

The MTF of each filter in combination with an objective lens, found by experimental determination with an MTF analyzer is shown graphically in FIGS. 12a–12c. The curves are plotted on semi-log paper, the ordinate being designed as the contrast ratio and the abscissa being the spatial frequency in line pairs per millimeter (l.p./mm.). The variances between the calculated and actual MTF produced by the deviation in actuality from ideal conditions are within the range of experimental error. For experimental determination, an Anti-Takumar 1:1.1/55 objective lens was used with a focal length, R, of 55 cm., 4× objective and numerical aperture 0.10. The wavelength of the light, $\lambda$, was 5500 A. The width, $d$, was chosen to be 0.30 mm. in order to provide a predicted spatial frequency cutoff at 10 l.p./mm. (line pairs per mm.) for the periodic amplitude and random phase filters. The first cutoff for the periodic phase filter is thus predicted at 5 l.p./mm.

In order to psychophysically evaluate a range of spatial phase filter aperture functions and corresponding NTF's for any particular system, it is not necessary to fabricate a range of spatial phase filters, according to the present invention. Rather, according to the method and apparatus shown in FIGS. 1 and 2, a transparency is first made of the image to be modified. The transparency is then inserted in an optical train designed for the elimination of one dimension of noise.

At Plane I of the optical train is provided a monochromatic line light source 12. This is accomplished by converging the light originating from a mercury arc 41 by lens 42 through a pinhole 43 to a collimator lens 44 and a square aperture 45. The light is then formed into a uniform line by using a cylindrical lens 46 and passed through a narrow band interference filter 47 to provide monochromaticity and a narrow slit 48 placed in the focal plane of the cylindrical lens to eliminate aberration and diffraction effects of the system. A fiber optics plate 50 placed in contact with the slit serves as a one-dimensional diffuser to provide the line light source at Plane I of the optical train.

The line light source provides coherent light in the direction of the $\tau'$ axis of Plane I and incoherent light in the direction of the $\nu'$ axis. The optical train is designed to eliminate noise patterns in the direction of the coherent light only and is thus particularly suited for use with real time scanning systems which produce one dimensional unidirectional optical noise.

The transparency is placed at Plane II with the optical noise pattern to be eliminated oriented in the Y direction, i.e. scan lines parallel to the X axis, and illuminated by the line light source. The collimator lens 14 adjacent the transparency focuses the light passed through the transparency forming the diffraction pattern, produced by the coherent light and optical noise pattern, in Plane III spaced from the collimator lens.

If the line source is replaced by a point source, the configuration of the optical train becomes the same as that on the double diffraction method. In the double diffraction method, the relationships between the wavefront of each Plane I, II, III and IV are expressed by $$II'' = F(I')$$

$$III'' = F^{-1}(II')$$

$$IV'' = F(III')$$

where F and $F^{-1}$ indicate respectively the Fourier transform and the inverse Fourier transform of the quantities. The single prime refers to the wavefront emitted from each plane and the double prime refers to the wavefront approaching each plane. It is known that the transfer function from Plane II to Plane IV is regarded as the same as the mask form placed at Plane III. However, since the light source is not a point but an incoherently illuminated line, the situation is more complex.

The one dimensional diffraction pattern produced by the coherent light passing through the optical noise pattern is approximately the Fourier transform in one direction of the image amplitude function at the transparency thereby providing, in effect, a one dimensional physical display of the spatial frequency spectrum of the object distribution. Undesirable portions of the spatial frequency spectrum attributable to the optical noise introduced by the scanning system may be easily eliminated by placing an opaque mask in Plane III with a transparent cut-out portion shaped to permit only certain portions of the spatial frequency spectrum to pass. Portions of the spectrum corresponding to the original object spectrum are permitted to pass, while spatial frequencies introduced by the scanning system spatial carrier frequency are blocked by the opaque portion of the mask.

An object lens 16 positioned adjacent the binary mask focuses the light permitted to pass through the mask to form the modified image $i(X', Y')$ at the screen 17 of Plane IV defined by the $x'$ and $Y'$ axes.

The shape of the cutout in binary mask 15 expressed in the coordinates of the function $P(\nu, \tau)$ is the MTF of the optical train in one dimension between Planes II and IV. Various shapes may be tried in order to block out the spatial carrier frequency of the scanning system while preserving the spatial frequency spectrum attributable to the original object whose image is being formed. FIGS. 11a–11j show graphically a range of MTF's adjacent the corresponding shape of the transparent cutout portion of a binary mask. The transparent cutout portion is shown in black.

In each of the graphs of the modulation transfer functions, the vertical axis indicates the percentage contrast ratio while the horizontal axis indicates the spatial frequency. The spatial frequency of the scan lines is indicated by a small delta on the horizontal axis.

The various modified images formed at Plane IV may be photographed for psychophysical evaluation. The shape determined to be most successful is the most successful MTF for the image forming and recording system from which the transparency was made. A spatial filter providing that MTF may thus be appropriately fabricated and inserted in the image forming aperture of the system.

If two or more directions of optical noise are to be eliminated, the components of optical noise in two or more directions are eliminated one at a time. The procedure using a transparency already described above would be followed to eliminate the optical noise in one direction, and the transparency would then be rotated appropriately to eliminate the optical noise in a second direction, etc.

The method of image modification may also be used to improve images having a blurr caused by high speed motion of the object whose image is being formed.

In the embodiments of the invention described above, the system of lens may be replaced with an equivalent system of mirrors as is well known in the art. The configuration of elements would then be appropriately modified.

While certain embodiments of this invention have been shown and described, it will be apparent that other adaptations and modifications can be made without departing from the true spirit and scope of the invention.

What is claimed is:

1. A method for optical spatial filtering in image forming systems comprising:
   forming a transparency of the image to be modified;
   illuminating the transparency with a line light source providing substantially coherent light in the direction of a noise pattern to be eliminated and incoherent light in the orthogonal direction lying in the plane of the transparency;
   forming a one dimensional diffraction pattern in the direction of the coherent light in a plane spaced from the transparency;
   placing sequentially a plurality of binary masks in the plane where the one dimensional diffraction pattern is formed, said masks comprising opaque portions and having transparent portions in the configuration of a range of transfer functions to be tested;
   determining the optimum modified image and corresponding binary mask and associated transfer function produced by said masks and
   fabricating a spatial filter having an aperture function providing said transfer function for the image forming system from which the transparency was made.

2. A method for optical filtering as set forth in claim 1 wherein the line light source provides substantially monochromatic light.

3. An optical spatial phase filter comprising a transparent plate having planar surfaces with transparent portions thereon for introducing phase shifts, said spatial filter fabricated according to the method of claim 1.

4. A method for determining the optimum transfer function for spatial filters for use in image forming systems comprising:
   forming a transparency of the image to be modified;
   illuminating the transparency with a line light source providing substantially coherent light in the direction of the noise pattern to be eliminated and incoherent light in the orthogonal direction in the plane of the transparency;
   forming a one dimensional diffraction pattern in the direction of the coherent light in a plane spaced from the transparency;
   placing sequentially a plurality of binary masks in the plane where the one dimensional diffraction pattern is formed, said masks comprising opaque portions and having transparent portions in the configuration of a range of transfer functions to be tested;
   forming the modified image from light passing through each binary mask;
   and determining the optimum image and corresponding binary mask and associated transfer function produced by said plurality of binary masks.

5. A method for determining the optimum transfer function as set forth in claim 4 wherein the line light source provides substantially monochromatic light.

6. Apparatus for determining the optimum MTF for spatial filters comprising:
   a transparency of the image to be modified;
   a monochromatic line light source positioned on one side and spaced from said transparency providing coherent light in the direction of an optical noise pattern to be eliminated and incoherent light in the orthogonal direction in the plane of the transparency;
   first image forming means positioned adjacent the transparency providing a one dimensional diffraction pattern, produced by the coherent light passing through the optical noise pattern, in a plane spaced from said first image forming means;
   a plurality of binary masks for sequential placement in the plane of the diffraction pattern said binary masks comprising substantially opaque portions and having transparent portions in the configuration of a range of MTF's to be tested;
   second image forming means positioned adjacent the sequentially placed binary masks to form a modified image.

7. A method for optical spatial filtering in image forming systems comprising:
   forming a transparency of the image to be modified;
   illuminating the transparency with a line light source providing substantially coherent light in the direction of a noise pattern to be eliminated and incoherent light in the orthogonal direction in the plane of the transparency;
   forming a one dimensional diffraction pattern in the direction of the coherent light in a plane spaced from the transparency;
   placing sequentially a plurality of binary masks in the plane where the one dimensional diffraction pattern is formed said masks comprising substantially opaque portions and having transparent cut-out portions in the configuration of a range of transfer functions to be tested;
   forming sequentially the modified images from light passing through the sequentially placed binary masks;
   determining the optimum image and corresponding binary mask and associated transfer function by psychophysical evaluation;
   fabricating a spatial filter having an aperture function providing the optimum transfer function for the image forming system from which the transparency was made;
   placing said spatial filter in the image forming aperture of the image forming system.

References Cited

UNITED STATES PATENTS

| | | | |
|---|---|---|---|
| 3,427,104 | 2/1969 | Blikken et al. | 350—162X |
| 2,240,108 | 3/1966 | Lehan et al. | 350—162(SF) |

OTHER REFERENCES

Brown et al., "Complex Spatial Filtering with Binary Masks," Applied Optics, vol. 5, No. 6, June 1966, pp. 967–969.

JOHN K. CORBIN, Primary Examiner

U.S. Cl. X.R.

356—124